UNITED STATES PATENT OFFICE.

WALTER V. TURNER, OF EDGEWOOD, PENNSYLVANIA, ASSIGNOR TO THE WESTING-HOUSE AIR BRAKE COMPANY, OF PITTSBURGH, PENNSYLVANIA, A CORPORATION OF PENNSYLVANIA.

FLUID-PRESSURE BRAKE.

1,131,969.  Specification of Letters Patent.  Patented Mar. 16, 1915.

Application filed November 16, 1910. Serial No. 592,699.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brakes, of which the following is a specification.

This invention relates to fluid pressure brakes, and more particularly to a brake equipment in which fluid under pressure is stored for operating apparatus other than the brakes.

With the constantly increasing tendency to employ compressed air on trains for various purposes other than controlling the fluid pressure brakes, it has become important to provide means for insuring an ample supply of air for such other purposes while not interfering in any way with the operation of the brakes.

It is desirable to provide a reservoir separate from the main reservoir for the storage of air for parasite purposes, so as to insure the maintenance of main reservoir pressure for braking, and this is especially true where the main reservoir is employed as a direct source of pressure for supplying fluid to the brake cylinder such as is the case, for example, with what is known as the ET engine brake equipment, shown in The Westinghouse Air Brake Company's Instruction Pamphlet No. 5032.

One object of my invention is to provide means, in connection with a brake equipment having a parasite reservoir of the above character, for charging said reservoir from the main reservoir only when the pressure in the main reservoir attains a predetermined degree.

Another object of my invention is to provide means adapted upon a reduction in main reservoir pressure, such as caused by breaking of the main reservoir supply pipe, for supplying fluid under pressure from the parasite reservoir to effect an application of the brakes.

Figure 1:
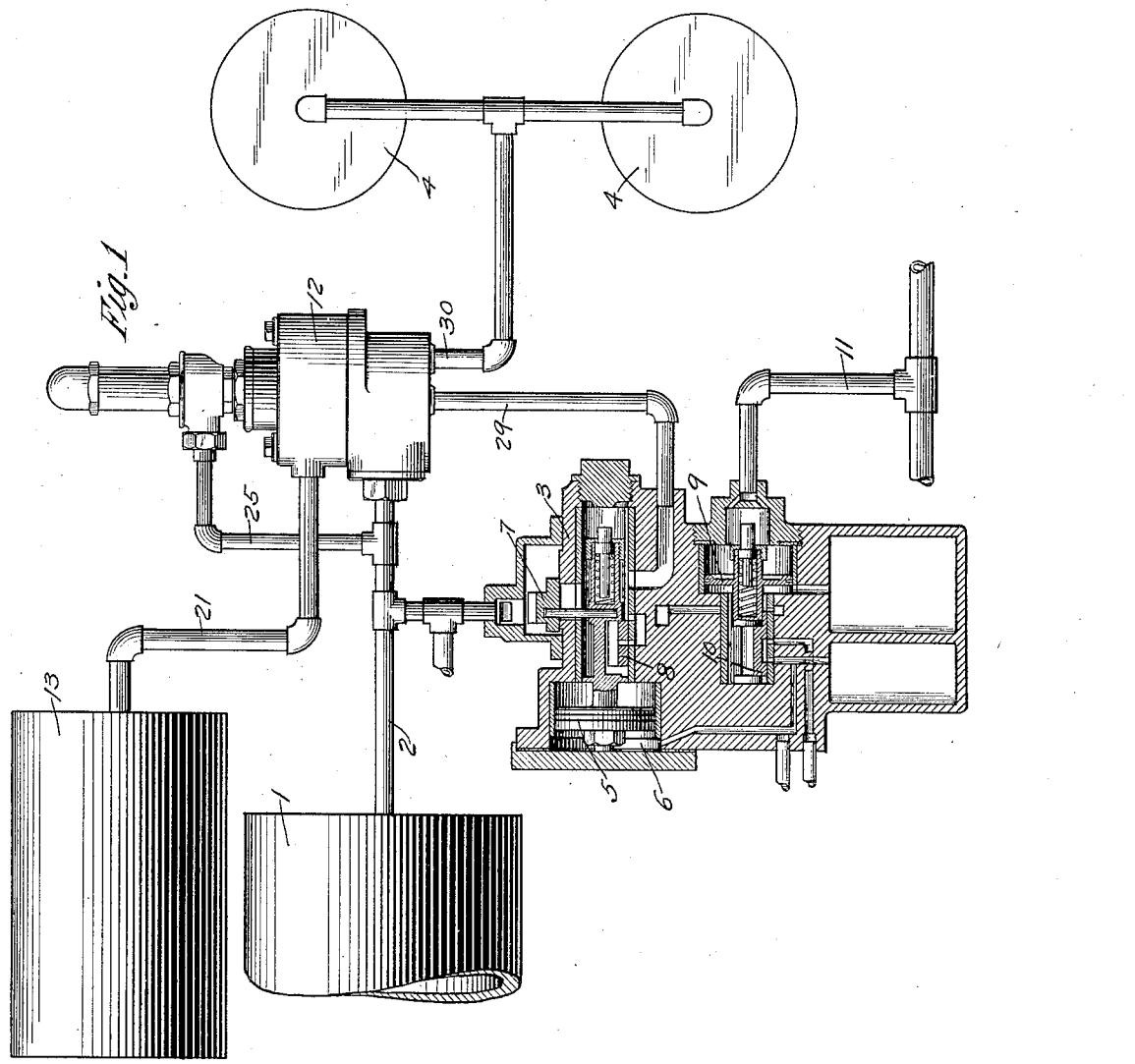
Figure 2:
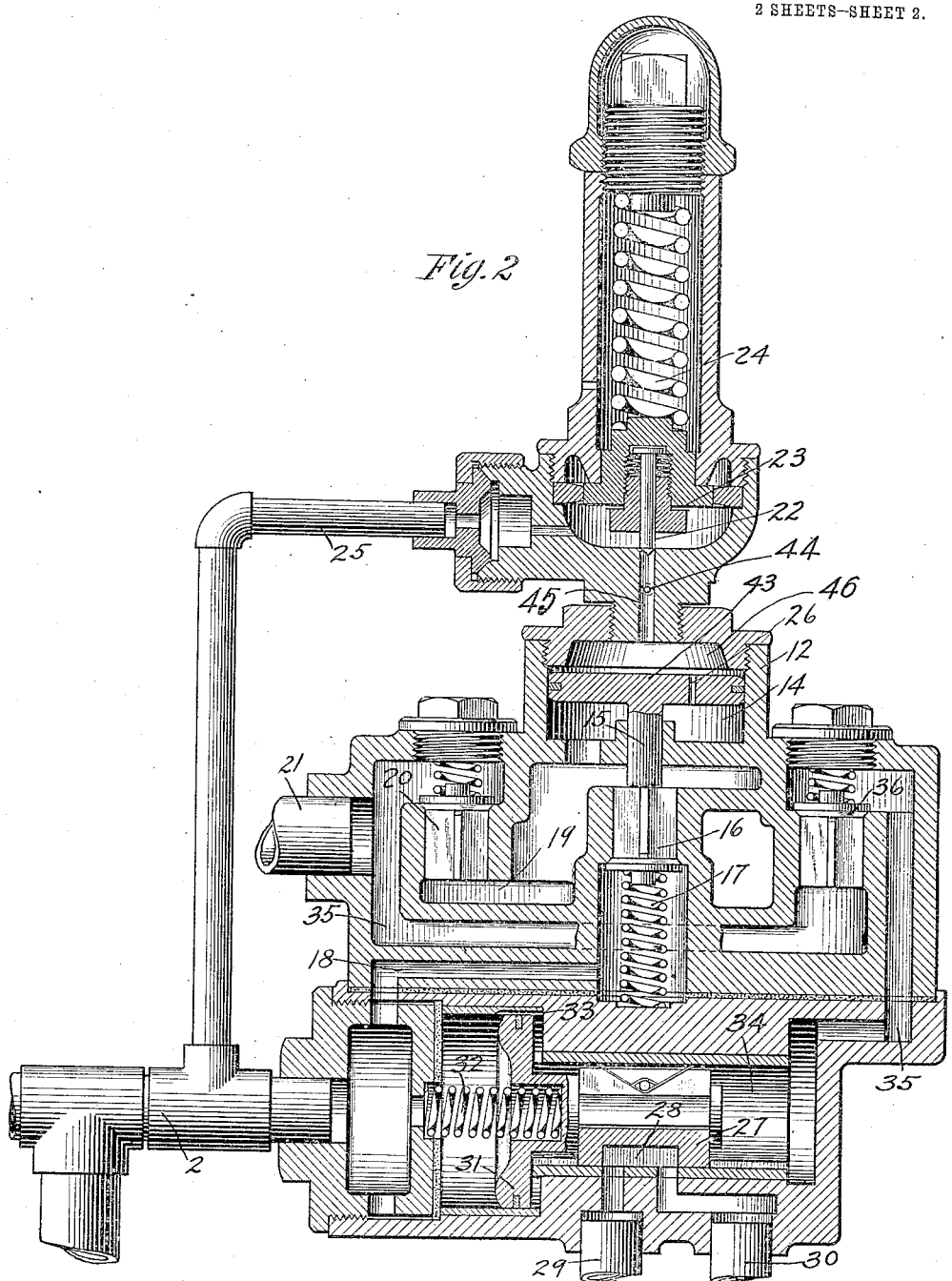

In the accompanying drawings; Figure 1 is a diagrammatic view of a portion of an engine brake equipment, showing my improvement applied thereto and Fig. 2 a sectional view of the controlling valve mechanism for the parasite reservoir.

As illustrated in Fig. 1, my invention is shown applied in connection with an ET locomotive brake equipment having a main reservoir 1, connected by pipe 2 to distributing valve 3, and brake cylinders 4.

The distributing valve 3 comprises the usual movable abutment 5 subject to the opposing pressures of the brake cylinder and the application chamber 6 for operating the respective brake cylinder application and release valves 7 and 8 and an automatic valve device having a piston 9 and slide valve 10 and controlled by variations in pressure in train pipe 11 for varying the pressure in the application chamber 6.

According to my invention a valve mechanism 12 is provided for controlling the pressure in a parasite reservoir 13 from which air is supplied for purposes other than controlling the brakes.

The controlling valve mechanism 12 preferably comprises a piston 43 contained in a piston chamber 14 and having a stem 15 adapted to engage a check valve 16 which is provided with a spring 17 tending to seat same.

The check valve 16 controls communication from a passage 18 leading to main reservoir pipe 2 to a passage 19 containing a check valve 20 and leading to pipe 21 which communicates with the parasite reservoir 13.

The supply of fluid for operating the piston 43 is controlled by a regulating valve 22 adapted to be operated by a diaphragm 23 subject to the opposing pressures of an adjustable spring 24 and the pressure in the main reservoir which is supplied to one side of the diaphragm through a pipe 25. The piston 43 is provided with an equalizing port 26 through which the fluid pressures on opposite sides of the piston tend to equalize and normally permit the spring 17 to maintain check valve 16 seated. When the main reservoir pressure is less than the pressure at which the spring 24 is adjusted, the valve 22 is held closed and since a restricted atmospheric exhaust port 44 communicates with passage 45, it will be clear that chamber 46 above piston 43 is maintained at atmospheric pressure, so long as the valve 22 remains seated. The chamber 14 below the piston 43 is also maintained at atmospheric pressure, as the same is in open communication with chamber 46 through port 26 in the piston 43. When fluid is compressed into the main reservoir 1, said pressure acts on the diaphragm 23 and it will be evident that the valve 22 is not opened until the main reservoir pressure equals or slightly exceeds the pressure of spring 24, then the valve 22 opens and fluid under pressure is admitted to one side of the piston 43, actuating the same to lift the valve 16 from its seat. Fluid from the main reservoir now flows through passages 18 and 19 past check valve 20 to the parasite reservoir pipe 21 charging said reservoir to the pressure carried in the main reservoir. When the pressure of fluid flowing to the parasite reservoir and acting on the under face of piston 43 substantially equals the main reservoir pressure on the opposite face of the piston, the spring 17 operates to close the valve 16. By this means, the main reservoir is permitted to charge up to a predetermined degree before communication is opened to the parasite reservoir, so as to insure obtaining ample main reservoir pressure for controlling the brakes before any fluid is supplied to the parasite reservoir. The pressure at which the spring 24 is adjusted may be varied to suit conditions, but preferably is adjusted at about 80 pounds, so that fluid is not supplied to the parasite reservoir until there is 80 pounds pressure in the main reservoir. If the main reservoir pipe which supplies fluid to the distributing valve should break or there should otherwise be a failure of main reservoir pressure, an application of the brakes could not be obtained on the engine, as the brake cylinders are supplied with fluid directly from the main reservoir by the action of the distributing valve.

Another feature of my invention consists in providing means adapted upon loss of main reservoir pressure to supply fluid from the parasite reservoir to the brake cylinder and thereby automatically effect an application of the brakes. For this purpose, a valve device is provided comprising a valve 27 having a cavity 28 adapted in the normal position of the valve to connect the brake cylinder application pipe 29 from the distributing valve 3 to the brake cylinder pipe 30 leading to the brake cylinders 4. A piston 31 subject on one side to the main reservoir pressure from pipe 2 is adapted to operate the valve 27. A spring 32 normally maintains the piston and valve in the position shown in Fig. 2 and in this position the main reservoir pressure equalizes through a feed groove 33 around piston 31 into the valve chamber 34. A passage 35 containing a check valve 36 affords communication from the pipe 21 and the parasite reservoir 13 to the valve chamber 34.

It will now be seen that normally the opposing pressures on the piston 31 are balanced and the spring 32 therefore maintains the parts with cavity 28 connecting the pipe 29 to the pipe 30, so that the brakes may be controlled in the ordinary manner by the operation of the distributing valve 3. If, however, the main reservoir pipe should break or the main reservoir pressure should suddenly fall from other cause, the pressure on the outer face of piston 31 also drops and thereupon, the higher pressure in the valve chamber 34 shifts the parts, closing the pipe 29 and opening the pipe 30 to the valve chamber 34. Fluid under pressure then flows from the parasite reservoir 13 through passage 35 past the check valve 36 to valve chamber 34 and thence to the brake cylinders 4, thereby effecting an application of the brakes.

By means of my invention, it will thus be seen that not only is the parasite reservoir prevented from effecting the usual normal conditions as to main reservoir pressure but also affords an additional safeguard in the event of breakage of the main reservoir supply pipe or other failure of main reservoir pressure.

Having now described my invention, what I claim as new and desire to secure by Letters Patent, is:—

1. In a fluid pressure brake, the combination with a main reservoir, of a parasite reservoir adapted to furnish fluid for purposes other than operating the brakes, and a valve device comprising a valve and an abutment subject to atmospheric pressure when fluid supply is cut off and means operating at a predetermined degree of pressure in the main reservoir for supplying fluid to said valve device for operating same to supply fluid from the main reservoir to the parasite reservoir.

2. In a fluid pressure brake, the combination with a main reservoir, of a parasite reservoir adapted to furnish fluid for purposes other than operating the brakes, a movable abutment, a valve operated thereby for controlling the supply of fluid from the main reservoir to the parasite reservoir, and means operating at a predetermined main reservoir pressure for supplying fluid to operate said abutment and valve.

3. In a fluid pressure brake, the combination with a main reservoir, of a parasite reservoir adapted to furnish fluid under pressure for purposes other than braking, and means operating upon a sudden reduction in main reservoir pressure for supplying air from the parasite reservoir to effect an application of the brakes.

4. In a fluid pressure brake, the combination with a main reservoir and brake cylinder, of an additional reservoir normally charged with fluid under pressure, a valve mechanism operated by variations in fluid pressure for supplying air from the main reservoir to the brake cylinder, and means operating upon failure of the main reservoir supply to said valve mechanism for supplying fluid from the additional reservoir to effect an application of the brakes.

5. In a fluid pressure brake, the combination with a main reservoir and brake cylinder, of an additional reservoir normally charged with fluid under pressure, a valve mechanism operated by variations in fluid pressure for supplying air from the main reservoir to the brake cylinder, and a valve device subject to the opposing pressures of the main reservoir and said additional reservoir for controlling the supply of fluid from said additional reservoir to the brake cylinder.

6. In a fluid pressure brake, the combination with a main reservoir and brake cylinder, of an additional reservoir normally charged with fluid under pressure, a valve mechanism operated by variations in fluid pressure for supplying air from the main reservoir to the brake cylinder, and a valve device normally establishing communication from said valve mechanism to the brake cylinder and operating upon a reduction in main reservoir pressure for supplying fluid from the additional reservoir to the brake cylinder.

7. In a fluid pressure brake, the combination with a main reservoir and brake cylinder, of an additional reservoir normally charged with fluid under pressure, a valve mechanism operated by variations in fluid pressure for supplying air from the main reservoir to the brake cylinder, and a valve device subject to the opposing pressures of the main reservoir and said additional reservoir and normally establishing communication from said valve mechanism to the brake cylinder and adapted to operate upon a reduction in main reservoir pressure to close said communication from the valve mechanism and open communication for supplying fluid from the additional reservoir to the brake cylinder.

In testimony whereof I have hereunto set my hand.

WALTER V. TURNER.

Witnesses:
S. W. KEEFER,
A. M. CLEMENTS.

Copies of this patent may be obtained for five cents each, by addressing the "Commissioner of Patents, Washington, D. C."